United States Patent [19]

Jansen et al.

[11] Patent Number: 5,718,804
[45] Date of Patent: Feb. 17, 1998

[54] PROCESS FOR THE PRODUCTION OF CELLULOSE-CONTAINING SHEET-LIKE STRUCTURES WHICH HAVE BEEN GIVEN A DRY STRENGTH AND/OR WET STRENGTH TREATMENT

[75] Inventors: Bernhard Jansen, Köln; Joachim König, Odenthal; Peter Nowak, Dormagen; Jürgen Reiners, Leverkusen, all of Germany

[73] Assignee: Bayer Aktiengesellschaft, Leverkusen, Germany

[21] Appl. No.: 538,315

[22] Filed: Oct. 3, 1995

[30] Foreign Application Priority Data

Oct. 10, 1994 [DE] Germany .................. 44 36 058.4

[51] Int. Cl.$^6$ .................................................. D21H 21/18
[52] U.S. Cl. .............. 162/164.6; 162/135; 162/164.1; 162/164.3; 427/391
[58] Field of Search .................. 162/164.6, 164.3, 162/168.2, 164.1, 158, 135; 427/389.9, 391, 394, 395

[56] References Cited

U.S. PATENT DOCUMENTS

| | | | |
|---|---|---|---|
| 4,505,778 | 3/1985 | Robertson | 162/164.6 |
| 4,670,100 | 6/1987 | Henning et al. | 162/164.6 |
| 5,503,714 | 4/1996 | Reiners et al. | 162/164.6 |

FOREIGN PATENT DOCUMENTS

| | | |
|---|---|---|
| 0207414 | 1/1987 | European Pat. Off. . |
| 0564912 | 10/1993 | European Pat. Off. . |
| 0582166 | 2/1994 | European Pat. Off. . |

OTHER PUBLICATIONS

Derwent Abstract of JP 61-173196, (equivalent to DE 42 11 480), (1994).

*Primary Examiner*—Peter Chin
*Attorney, Agent, or Firm*—Sprung Kramer Schaefer & Briscoe

[57] ABSTRACT

Process for the production of optionally wood-containing cellulose-containing sheet-like structures, such as paper, pasteboard and card, which have been given a dry strength and/or wet strength treatment and have improved whiteness, using water-dispersible isocyanates, wherein the water-dispersible isocyanates:

a) are aliphatic, cycloaliphatic, araliphatic or aromatic isocyanates having an NCO functionality of 1.8 to 4.2, mixed with polyether-modified aliphatic, cycloaliphatic, araliphatic or aromatic isocyanates having an average NCO functionality of 0.8 to 3.2, b) the isocyanate mixtures a) contain 1 to 25% by weight of isocyanate groups, c) have a content of ethylene oxide units, arranged in the form of polyether chains of average molecular weight 10 to 3500 (number-average), of 20 to 60% by weight, based on the isocyanate mixture, and if appropriate d) have a content of tertiary amino groups and/or ammonium groups of 1 to 500 milliequivalents per 100 g of isocyanate mixture a).

4 Claims, No Drawings

PROCESS FOR THE PRODUCTION OF CELLULOSE-CONTAINING SHEET-LIKE STRUCTURES WHICH HAVE BEEN GIVEN A DRY STRENGTH AND/OR WET STRENGTH TREATMENT

The present invention relates to a process for the production of optionally wood-containing cellulose-containing sheet-like structures, such as, for example, paper, pasteboard and card, which have been given a dry strength and/or wet strength treatment and have improved whiteness, using water-dispersible isocyanates.

Isocyanates have been known for a long time as additives in papermaking.

A process for wet strength treatment of paper with the aid of water-dispersible polyisocyanate mixtures containing 2 to 20% by weight of ethylene oxide units arranged in the form of polyether chains, the polyether chains containing on average 5 to 70 ethylene oxide units, is known specifically from DE-A 4 211 480.

This treatment does not impair the whiteness of the paper.

EP-A 0 582 166 describes the use of polyisocyanate mixtures which contain tertiary amino groups and/or ammonium groups and 0 to 30% by weight (based on the mixture) of ethylene oxide units in the form of polyether chains for the production of cellulose-containing sheet-like structures which have been given a dry strength and wet strength treatment and/or sized. Here also, the whiteness of the product produced is not influenced.

The invention is based on the finding that higher contents of ethylene oxide units in the form of polyether chains, based on the polyisocyanate mixture, as envisaged in EP-A 0 582 166 and DE-A 4 211 480, have the effect of an additional increase in wet strength. This is unexpected, became the increase in the polyether content results in a reduction of the isocyanate content, that is to say the groups which react with cellulose. The increase in whiteness of the papers, pasteboards and cards treated as the polyether content increases is completely surprising. An increase in whiteness during papermaking is usually possible only by bleaching the chemical pulp or by co-using optical brighteners.

The invention relates to a process for the production of optionally wood-containing sheet-like structures, such as paper, pasteboard and card, which have been given a dry strength and/or wet strength treatment and have improved whiteness, using water-dispersible isocyanates, which is characterized in that the water-dispersible isocyanates used:

a) are aliphatic, cycloaliphatic, araliphatic or aromatic isocyanates having an NCO functionality of 1.8 to 4.2, mixed with polyether-modified aliphatic, cycloaliphatic, araliphatic or aromatic isocyanates having an NCO functionality of 0.8 to 3.2, b) the isocyanate mixtures a) contain 1 to 25% by weight of isocyanate groups, c) have a content of ethylene oxide units, arranged in the form of polyether chains of average molecular Weight 100 to 35000 (number-average), of 20 to 60% by weight (or 30 to 60% by weight if tertiary amino and/or ammonium groups are present), based on the isocyanate mixture, and if appropriate d) have a content of tertiary amino groups and/or ammonium groups of 1 to 500 milliequivalents per 100 g of isocyanate mixture a).

The isocyanate mixtures a) preferably contain 1 to 23% by weight of isocyanate groups and have a content of ethylene oxide units, arranged in the form of polyether chains of average molecular weight 100 to 1000, preferably 100 to 600 (number-average), of 20 to 50% by weight (or 30 to 50% by weight if tertiary amino and/or ammonium groups are present), based on the isocyanate mixture.

The water-dispersible polyisocyanates are obtainable by reaction, in any desired sequence, of:

I. one or more non-modified polyisocyanates having an average NCO functionality of 1.8 to 4.2, II. mono- or polyfunctional polyalkylene oxide polyether alcohols containing on average 5.0 to 70 ethylene oxide units and optionally containing ester groups, and optionally, III.A) amines which contain a group which is reactive towards isocyanates, of the formula A1)

$$H-Y^1-X-N\diagup^{R^1}_{R^2} \quad (A1)$$

in which $Y^1$ represents O, NH or $NR^3$, ($R^3$=methyl or ethyl), $R^1$ and $R^2$ a) independently of one another represent $C_1$–$C_4$-alkyl or $C_3$–$C_6$-cycloalkyl or b) represent a radical of the formula $$-(\underset{\underset{R^4}{|}}{CH}-\underset{\underset{R^5}{|}}{CH}-O-)_a-\underset{\underset{R^4}{|}}{CH}-\underset{\underset{R^5}{|}}{CH}-O-R^6$$

wherein $R^4$ and $R^5$ independently of one another denote hydrogen or methyl, but one of the radicals is always hydrogen, $R^6$ denotes methyl or ethyl and a is a number from 0 to 10, or c) represent a $C_2$–$C_4$-alkyl radical substituted by one or more tertiary amino groups and/or ammonium groups, of the formula $$-CH_2-CH_2-(CH_2)_b-N\diagup^{[(CH_2)_q-CH_2-N\overset{R^6}{\underset{R^6}{\overset{|}{+}}}R^6]}_{[(CH_2)_r-CH_2-N\overset{R^6}{\underset{R^6}{\overset{|}{+}}}R^6]}$$

or $$-CH_2-CH_2-(CH_2)_b-N\diagup\hspace{-0.2cm}\diagdown N+(CH_2)_q-CH_2-N\overset{R^6}{\underset{R^6}{\overset{|}{+}}}R^6$$

wherein b is a number from 0 to 2, q and t independently of one another denote 1 or 2 and r and s independently of one another denote a number from 0 to 3 and $R^6$ has the abovementioned meaning or d) together with the N atom to which they are bonded form a 5- or 6-membered ring of the formula

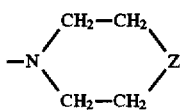

wherein
Z represents

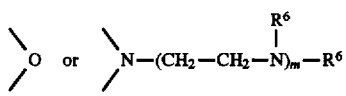

or

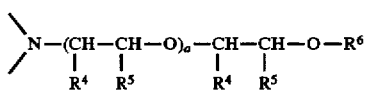

wherein
m is a number from 0 to 2 and
a, $R^4$ and $R^6$ have the abovementioned meaning,
X represents $C_2$- to $C_{10}$-alkylene, $C_5$ to $C_{10}$-cycloalkylene, a radical of the formula

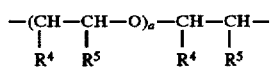

wherein $R^4$, $R^5$ and a have the abovementioned meaning, or a radical of the formula

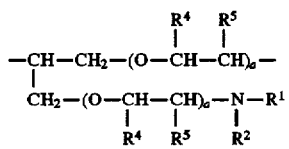

in which
a, $R^4$, $R^5$, $R^1$ and $R^2$ have the abovementioned meaning, or

A2) of the formula

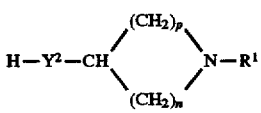

wherein
$Y^2$ represents —O—, —NH— or $NR^3$, wherein $R^3$ has the abovementioned meaning, n and p independently of one another assume the values 1 or 2 and $R^1$ has the abovementioned meaning, or A3) of the formula

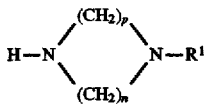

wherein n, p and $R^1$ have the abovementioned meaning, or

A4) of the formula

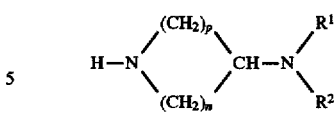

wherein n, p, $R^1$ and $R^2$ have the abovementioned meaning, or

B) amines which contain more than one group which is reactive towards isocyanates and optionally contain ether and/or ester and/or amide groups and have a molecular weight of less than 10000 g/mol or C) the compounds which are obtained by reaction of A) or B) by protonation and/or quaternization, contain ammonium groups and are reactive towards isocyanates, or any desired mixtures of A) to C).

The amines III are described in more detail in EP-A 582 166.

In this context, the term "water-dispersible" means that in a concentration of up to 70% by weight, preferably up to 50% by weight, in water, the mixtures give finely divided dispersions with particle sizes (ultracentrifuge) of <500 nm.

Examples of possible starting substances for the water-dispersible isocyanates are:

I. Non-modified, aliphatic, cycloaliphatic, araliphatic or aromatic isocyanates having an NCO functionality of 1.8 to 4.2. Aliphatic and cycloaliphatic polyisocyanates which contain uretdione and/or isocyanurate and/or allophanate and/or biuret and/or oxadiazine structures and which can be prepared in a manner known per se from aliphatic, cycloaliphatic, araliphatic or aromatic diisocyanates are preferred. Examples which are suitable are: 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,3- and 1,4-diisocyanatocyclohexane, 1-isocyanato-3,3,5-trimethyl-5-isocyanatomethylcyclohexane, 1-isocyanato-1-methyl-4-isocyanatomethylcyclohexane and 4,4-diisocyanatodicyclohexyl-methane, or any desired mixtures of such diisocyanates.

The preferred reaction products of these diisocyanates containing uretdione, isocyanurate, allophanate or oxadiazine groups are essentially polyisocyanate mixtures having an NCO content of 19 to 24% by weight which comprise trimeric 1,6-diisocyanatohexane or 1-isocyanato-3,3,5-trimethyl-5-isocyanatomethyl-cyclohexane and the corresponding higher homologues and containing isocyanurate groups and optionally uretdione groups. The corresponding polyisocyanates of the NCO content mentioned which are largely free from uretdione groups and contain isocyanurate groups, such as are obtained by catalytic trimerization, which is known per se, of 1,6-diisocyanatohexane or 1-isocyanato-3,3,5-trimethyl-5-isocyanatomethylcyclohexane to form isocyanurate and which preferably have an (average) NCO functionality of 3.2 to 4.2 are particularly preferably used. The trimeric polyisocyanates having an NCO content of 19 to 24% by weight which are obtained by reaction of 1,6-diisocyanatohexane with less than the equimolar mount of water in a known manner and essentially contain biuret groups are also preferred.

Other suitable polyisocyanates are aliphatic or aromatic diisocyanates, such as hexamethylene diisocyanate, tolylene diisocyanate, 1,5-diisocyanatonaphthalene, diphenylmethane diisocyanate and higher homologues thereof with uretdione, isocyanurate, allophanate and biuret groups.

II. The polyalkylene oxide ether alcohols are mono- or polyfunctional polyalkylene oxide polyether alcohols which contain a statistical average of 5 to 70, preferably 6 to 60, ethylene oxide units per molecule, such as are accessible in a manner known per se by alkoxylation of suitable starter molecules.

Any desired mono- or polyhydric alcohols of molecular weight range 32 to 150 g/mol can be employed as starter molecules for the preparation of these polyalkylene oxide polyether alcohols. Monofunctional aliphatic alcohols having 1 to 4 carbon atoms are preferred. Methanol or ethylene glycol monomethyl ether is particularly preferred. Alkylene oxides which are suitable for the alkoxylation reaction are, in particular, ethylene oxide and propylene oxide, which can be employed in the alkoxylation reaction in any desired sequence or also as a mixture.

The polyalkylene oxide polyether alcohols II are either pure polyethylene oxide polyethers or mixed polyalkylene oxide polyethers which contain at least one polyether sequence, have at least 5, in general 5 to 70, preferably 6 to 60 and particularly preferably 7 to 20, ethylene oxide units, and the alkylene oxide units of which consist of ethylene oxide units to the extent of at least 60 mol %, preferably to the extent of at least 70 mol %. Preferred such polyalkylene oxide polyether alcohols are monofunctional polyalkylene oxide polyethers which have been started on an aliphatic alcohol containing 1 to 4 carbon atoms and contain a statistical average of 6 to 60 ethylene oxide units. Particularly preferred polyalkylene oxide polyether alcohols are pure polyethylene glycol monomethyl ether alcohols which contain a statistical average of 7 to 20 ethylene oxide units. Suitable polyalkylene oxide polyethers containing ester groups are OH-terminated polyester ethers which are obtainable by reaction of aliphatic $C_2$- to $C_8$-dicarboxylic acids or esters or acid chlorides thereof with polyethers from the group consisting of polyethylene oxides, polypropylene oxides or mixtures or copolyethers thereof; 0.8 to 0.99 equivalents of carboxyl groups or derivatives thereof being employed per OH equivalent of the polyether, and which have an average molecular weight of less than 10000 g/mol, preferably less than 3000 g/mol, and contain hydroxyl end groups.

III. The following amines III.A) may be mentioned as examples: N,N'-dimethylethylenediamine, N,N'-dimethylpropylenediamine, dimethylaminohydroxyethane, dimethylaminohydroxypropane, diethylaminohydroxyethane, dibutylaminohydroxyethane, diethylaminoethoxyhydroxyethane, (2-diethylaminoethoxy)-ethoxyhydroxyethane, N,N'-triethyl-N'-[ω-hydroxy-tetraethoxyethyl]propylenediamine, N-hydroxyethyl-morpholine, N-hydroxyethylmethylpiperazine, N-hydroxyethylpiperidine, N-hydroxyethylpyrrolidine, 4-hydroxy-N-methylpiperidine, 4-hydroxy-1-dimethylaminocyclohexane, 1,3-bis(dimethylaminoethoxy)-2-hydroxypropane,1,3-bis(dimethylaminopropoxy)-2-hydroxypropane and the amines of the following formulae:

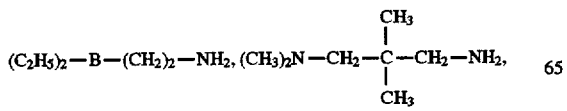

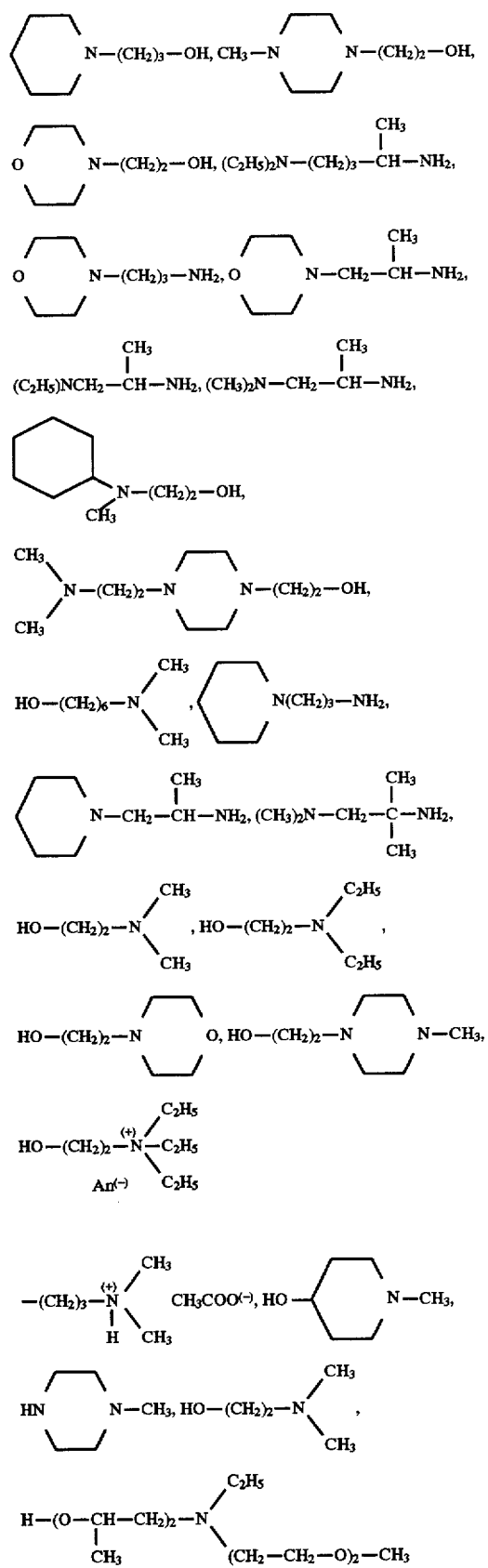

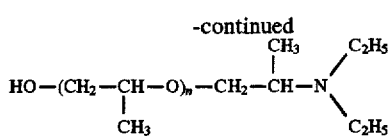

where n=1 to 10,

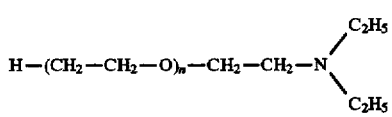

where n=1 to 10, towards isocyanates and if appropriate contain ether and/or ester and/or amide groups and have a molecular weight of less than 10000 g/mol are: methyl-bis(2-hydroxyethyl)-amine, methyl-bis(2-hydroxypropyl)-amine, N,N'-bis(2-hydroxyethyl)-N,N'-dimethylethylenediamine, N,N"-bis(2-hydroxyethoxyethyl)-N,N',N"-trimethyl-diethylenetriamine, N,N-dimethylamino-propyl-bis-[ω-hydroxytetraethoxyethyl]amine, triethanolamine, reaction products of triethanolamine with 3 to 20 mol of ethylene oxide and/or propylene oxide per mole of amine, reaction products of polyamines, such as aminoethylpiperazine, triethylenetetramine or bis-(2-aminoethyl)piperazine, with ethylene oxide and/or propylene oxide, diethylenetriaminebispropionamide, N,N'-bis-propionylaminoethyl-N"-(2-hydroxyethyl)amine and reaction products of tetramethylethylenediamine-dichloroethane condensates with ethylene oxide and/or propylene oxide.

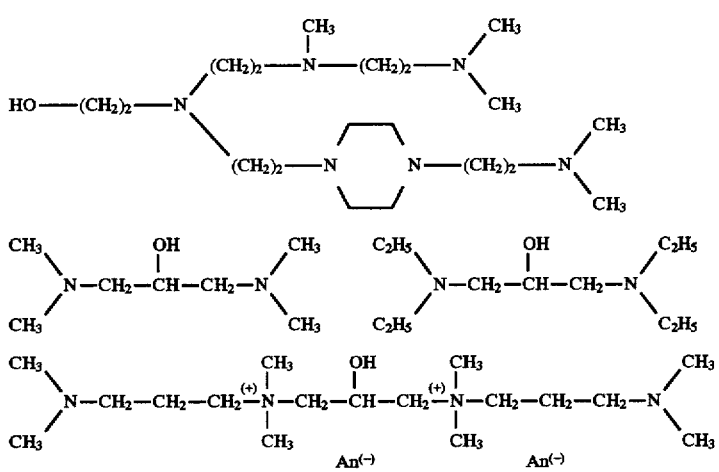

where $An^{(-)}=Cl^{(-)}, Br^{(-)}, CH_3OSO_3^{(-)}$

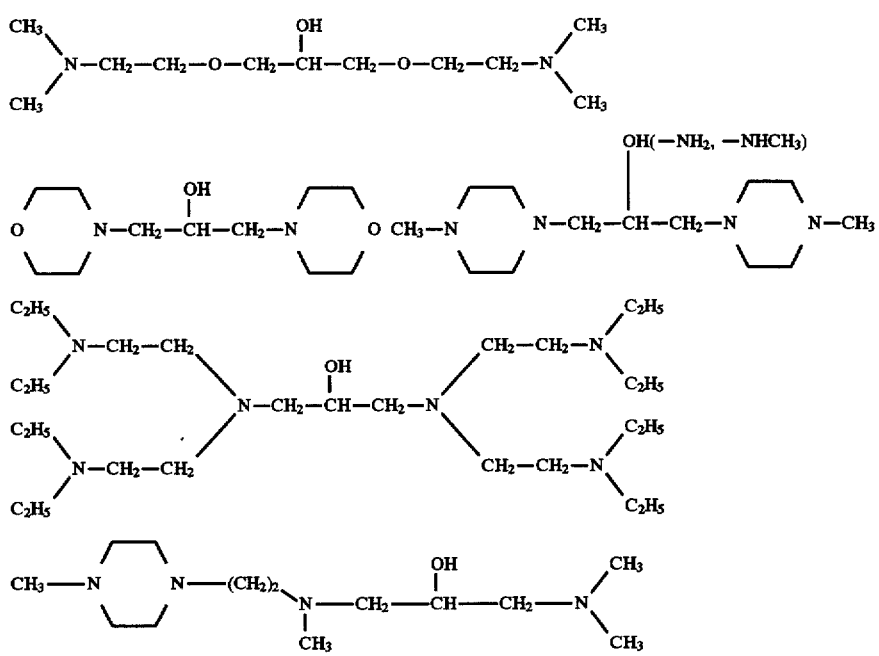

Examples which may be mentioned of amines III.B) which contain more than one group which is reactive Suitable amines III.B) are, for example, also the following polycondensates:

a. hydroxy-terminated polyesters prepared by condensation of $C_2$- to $C_8$-dicarboxylic acids, polyethylene oxide and/or polypropylene oxide, or copolyethers of ethylene oxide and propylene oxide, and dihydroxyalkylamines, preferably N-methyldiisopropanolamine, having an OH functionality of 2, b. hydroxy-terminated polyesters prepared by condensation of $C_2$- to $C_8$-dicarboxylic acids and the dihydroxyalkylamines listed under a) having an OH functionality of 2, c. hydroxy-terminated or amino-functional polyesteramides of $C_2$- to $C_8$-dicarboxylic acids, $C_2$- to $C_6$-diaminoalkanes, preferably ethylenediamine, and the dihydroxyalkylamines listed under a), having an OH functionality of 2, d. hydroxy-terminated polyesters of $C_2$- to $C_8$-dicarboxylic acids, trishydroxyalkanes, preferably trimethylolpropane, and reaction products thereof with 1 to 10 mol of ethylene oxide or propylene oxide, and the dihydroxyalkylamines listed under a), having a functionality of more than 2, e. hydroxy-functional polyamines which are obtainable by reaction of ammonia or linear or branched (poly) alkylenepolyamines, such as, for example, ethylenediamine, diethylenetriamine, triethylenetetramine, bis(3-aminopropyl)methylamine, α,ω-polyetherdiamines with primary or secondary amino groups or condensates thereof with less than the equimolar mount of dihalogenoalkanes, such as dichloroethane, with alkylene oxides, preferably triethanolamine, tris(2-hydroxypropyl)amine or tetrakis(2-hydroxypropyl)ethylenediamine, f) hydroxy-functional polyamidoamines which are obtainable by reaction of linear or branched polycondensates of $C_2$- to $C_8$-dicarboxylic acids, diamines and polyamines containing at least three acylatable amino groups, such as diethyleneamine or triethylenetetramine, and/or polyamines having at least two acylatable amino groups and further tertiary amino groups, such as bis-(3-aminopropyl)-methylamine, and if appropriate caprolactam or if appropriate polyetherdiols or polyetherdiamines, with alkylene oxides, 1–3 mol of alkylene oxide being employed per primary and secondary amino group in the polycondensate, g) hydroxy-functional polyamidoamines according to f) which, instead of reaction with alkylene oxides, contain hydroxyethyl end groups and are obtainable by cocondensation with ethanolamine, h) amino alcohols of the formula

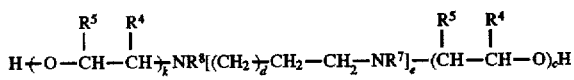

wherein $R^4$ and $R^5$ represent hydrogen or methyl, with the condition that one radical always represents hydrogen, $R^8$ and $R^7$ independently of one another represent methyl, ethyl or a radical of the formula —(CHR⁵—CHR⁴—O)$_f$—H or —[CH₂(CH₂)$_e$—NR¹]$_h$R², wherein $R^1$ and $R^2$ have the abovementioned meaning and g assumes values from 1 to 6, h represents 0 to 4, $R^4$ and $R^5$ have the abovementioned meaning k, c and f assume values from 0 to 20, e assumes values from 0 to 3 and d assumes values of 0 or 1.

The amines III.B) in general preferably have an average molecular weight of less than g/mol. Those having an average molecular weight of less than 5000 g/mol, in particular less than 3000 g/mol, are particularly preferred.

Examples which may be mentioned of the compounds mentioned under III.C) which are obtained by protonation and/or quaternization, contain ammonium groups and are reactive towards isocyanates are:

the compounds obtainable by reaction of acids or alkylating agents with the components III.A) or III.B), all or some of the tertiary amino groups of which have been converted into ammonium groups.

Acids which are suitable for this reaction are preferably acetic acid, formic acid and HCl, and possible alkylating agents are, for example, $C_1$–$C_4$-alkylchlorides and bromides, as well as dialkyl sulphates, such as dimethyl sulphate or diethyl sulphate.

The water-dispersible polyisocyanates can be prepared by reaction oft he following residual monomers in any desired sequence:

I. non-modified polyisocyanates

II. mono- or polyfunctional polyalkylene oxide polyether alcohols

III. amines.

If the amines III.A) to III.C) contain polyether chains, reaction of III.A) and/or III.B) and/or C) with the polyisocyanates I. can also lead directly to water-dispersible polyisocyanates, so that the content of component II. can be reduced if appropriate. The non-modified polyisocyanates I. to be employed according to the invention can also be employed in combination with external ionic or nonionic emulsifiers. Such emulsifiers are described, for example, in Methoden der organischen Chemie [Methods of organic chemistry], Houben-Weyl, vol. XIV/1, part 1, pages 190–208, Thieme-Verlag, Stuttgart (1961), in U.S. Pat. No. 3,428,592 and in EP-A 0 013 112. The emulsifiers are employed in an amount which ensures dispersibility. If polyisocyanates I. are initially reacted with polyalkylene oxide polyether alcohols II., this reaction can be carried out in a manner known per se, maintaining an NCO/OH equivalent ratio of at least 2:1, in general 4:1 to about 1000:1, polyether-modified polyisocyanates having an average NCO functionality of 1.8 to 4.2, preferably 2.0 to 4.0, a content of aliphatically or cycloaliphatically bonded isocyanate groups of 12.0 to 21.5% by weight and a content of ethylene oxide units located within polyether chains (calculated as $C_2H_4O$, molecular weight=44 g/mol) of 2 to 20% by weight, the polyether chains containing a statistical average of 5 to 70 ethylene oxide units, being obtained.

The corresponding water-dispersible polyisocyanate mixtures which are obtainable by protonation and/or quaternation of the non-modified polyisocyanate mixtures I. to be employed according to the invention and which contain ammonium groups are also suitable for carrying out the process. Alkylating agents, such as, for example, dimethyl sulphate, diethyl sulphate or $C_1$–$C_4$-alkyl halides and $C_1$–$C_4$-alkylsulphonates, can be used for the quaternization.

The starting components can be reacted in any desired sequence, with exclusion of moisture and preferably without a solvent. As the mount of alcohol component increases, a higher viscosity of the end product is achieved, so that in certain cases (if the viscosity rises above 100 Pas, for example) a solvent which is preferably water-miscible but is inert towards the polyisocyanate can be added. Suitable solvents are:

Alkyl ether acetates, glycol diesters, toluene, carboxylic acid esters, acetone, methyl ethyl ketone, tetrahydrofuran and dimethylformamide.

The reaction can be accelerated by coming catalysts which are known per se, such as dibutyltin dilaurate, tin(II) octoate or 1,4-diazabicyclo[2.2.2]octane, in amounts of 10 to 1000 ppm, based on the reaction components. The reaction is carried out in the temperature range up to 130° C., preferably in the range between 10° C. and 100° C., particularly preferably between 20° C. and 80° C. The reaction is monitored by titration of the NCO content or by measurement of the IR spectra and evaluation of the NCO band at 2260–2275 cm$^{-1}$, and has ended when the isocyanate content is not more than 0.1% by weight above the value which is achieved with complete conversion at the given stoichiometry. Reaction times of less than 24 hours are as a rule sufficient. Solvent-free synthesis of the polyisocyanates to be employed according to the invention is preferred.

In another embodiment, it is also possible to prepare the polyisocyanate mixtures to be employed according to the invention by mixing 1) non-modified polyisocyanates I),
2) polyisocyanates which are obtained by reaction of polyisocyanates I) with the amines mentioned under III), the equivalent ratio of groups of III) which are reactive towards isocyanates to the NCO groups employed in component II) being 1:1 to 1:1000, and
3) polyisocyanates which are obtained by reaction of polyisocyanates I. with polyalkylene oxide polyether alcohols II., the equivalent ratio of groups of component II. which are reactive towards isocyanates to the NCO groups employed in component I) being 1:1 to 1:1000. The number of amine equivalents, the polyether content, the NCO content and the NCO functionality here are to be adjusted by appropriate weights by the expert such that the resulting mixture has the composition required for water-dispersibility, the preferred ranges already mentioned applying.

The water-dispersible polyisocyanate mixtures are easy to handle industrially and are storage-stable for many months with exclusion of moisture.

The water-dispersible polyisocyanate mixtures are preferably employed according to the invention without organic solvents. They are very easy to emulsify in water—if appropriate with addition of acids—and/or at temperatures up to 100° C. The active compound content of the emulsion can be up to 70% by weight. However, it is more advantageous to prepare emulsions having an active compound content of 1 to 50% by weight, which can then be diluted further, if necessary, before the metering point. The mixing units customary in the art (stirrers, mixers with the rotor-stator principle and, for example, high-pressure emulsifying machines) are suitable for the emulsification.

The preferred polyisocyanates are self-emulsifying, i.e. they can easily be emulsified after addition to the aqueous phase even without the action of high shearing forces. A static mixer is as a rule sufficient. The resulting emulsions have a processing time of up to 24 hours, which depends on the structure of the polyisocyanates to be employed according to the invention, in particular on their content of basic N atoms.

The processing time is the period within which the optimum dry and wet strength action is achieved.

To facilitate incorporation into the aqueous phase, it may be expedient to employ the water-dispersible polyisocyanate mixture as a solution in a solvent which is inert towards isocyanate groups. Suitable solvents are, for example, ethyl acetate, ethylene glycol diacetate, propylene glycol diacetate, 2-butanone, 1-methoxyprop-2-yl acetate, toluene or mixtures thereof. The content of the solvent in the solution of the polyisocyanate should be not more than 80% by weight, preferably not more than 50% by weight. The use of solvent-free, water-dispersible polyisocyanates is particularly preferred.

The cellulose-containing materials which are suitable for the process according to the invention are, for example, paper or paper-like materials, such as pasteboard or card. The polyisocyanate mixtures preferred for the wet strength and dry strength treatment have an NCO functionality of greater than 2.

According to the invention, the water-dispersible polyisocyanates can be employed in the pulp, and they are then added directly to the cellulose-containing dispersion of the fibrous raw materials. For this, the polyisocyanate mixture is emulsified in water at a temperature of 20° C. to 80° C. and the resulting emulsion is added to a suspension of the fibrous raw material or dispersed directly in the suspension of the fibrous materials and the paper is formed by dewatering from the suspension formed and then dried. For emulsification of the polyisocyanate mixture, it is expedient to initially introduce 1 to 4 times the amount of water into the container. Higher amounts of water are also possible. For use in the surface, a finished basepaper is treated with an emulsion of the polyisocyanate mixture in water and then dried. Use in the sizing press is possible. In this case, the polyisocyanate mixture, emulsified in water, is transferred to the finished paper web. The dry and wet strength effect is achieved immediately after drying. The wet strength effect which can be achieved by surface treatment considerably exceeds that which can be achieved with the wet strength agents known to date using the same dosage of active substance.

It is particularly preferable to meter the aqueous emulsion of the polyisocyanates into the fibrous material in the course of 60 minutes, preferably in the course of 15 minutes. To achieve the optimum wet strength effect under conditions in practice, it is particularly advisable to meter in the polyisocyanate, for example, shortly before the headbox of the papermaking machine. For testing, sheets of paper having a weight per unit area of 50 to 100 g/m$^2$ are in general formed in the laboratory.

In water, the NCO groups of the polyisocyanate mixtures to be employed according to the invention hydrolyse slowly with evolution of $CO_2$ to give the corresponding amines, which partly react with NCO groups still present to give urea groups. Advantageously, however, no precipitates occur. In the process according to the invention, the products can be metered into the solid in the pulp in the pH range between 4 and 10, preferably between 5.5 and 9. Use in the neutral pH range (pH 6 to 7.5) is particularly preferred. In this pH range, some of the tertiary amino groups are present in protonated form.

It is also possible to carry out the dispersing operation with the addition of acid. A cationic charge independent of the pH is obtained if polyisocyanates obtained by quaternization of the tertiary amino groups are employed. However, quaternization is not necessary for most uses.

The amounts of water-dispersible polyisocyanate depend on the effect required. As a rule, amounts of 0.001 to 50% by weight, preferably 0.1 to 10% by weight, particularly preferably 0.1 to 2.0% by weight of active compound, based on the dry fibrous raw material, are sufficient. The dosage of the active substance, based on the fibrous raw material, corresponds to that of known wet strength agents of the polyamidoamine-epichlorohydrin type. The polyisocyanates give ready-to-use papers of good wet strength immediately from the machine. An intensification of the wet strength action can be achieved by storage of the finished paper and/or after-condensation. Generally, however, a higher level of wet strength can already be achieved from the machine than with conventional wet strength agents. The dry strength is also improved compared with conventional wet strength agents.

The process according to the invention is carded out at customary temperatures. The processing time depends on the temperature. At temperatures of 20° to 25° C., the processing time is relatively long. After storage of the aqueous emulsion for 6 hours, the wet strength action still reaches about 70% of the value on immediate use of the emulsion. At a higher temperature, for example at 50° C., processing within 6 hours is to be recommended. On the other hand, the maximum wet strength action surprisingly depends hardly at all on the contact time with the cellulose. Papers which have been formed immediately and after a contact time of 2 hours after addition of the water-dispersible polyisocyanate to the paper fibrous material each show the same level of wet strength. The strength of the paper can be adjusted in the desired manner by suitable choice of the starting components. The process according to the invention is suitable not only for production of papers with dry strength and wet strength, but also for production of papers which are resistant to oil and petrol.

The water-dispersible polyisocyanates can be employed in combination with other cationic auxiliaries, such as retention agents, fixing auxiliaries, drying auxiliaries and wet strength agents. In particular, the fixing of fillers can be intensified further by addition of commercially available retention agents of the type of cationic polycondensates and polymers, for example polyamides, polyethyleneimines, polyamidoamines and polyacrylamides, as well as of dual systems comprising cationic or cationic and anionic and if, appropriate particular components, such as silica sols and the like. Ibis is of particular interest if use in the laminated paper sector is intended. Preferred retention agents are cationic polycondensates of polyamines, preferably N-methyl-bis(3-amino-propyl)-amine, and alkylene dihalides, preferably dichloroethane. However, it should be emphasized that the desired wet strength effect can also be achieved without addition of particular fixing agents. The strength of the paper can be increased, in particular, by combination with polysaccharides, such as hydroxyethylcellulose, carboxymethylcellulose, starch, galactomannans or cationic derivatives thereof.

The polyisocyanate mixtures can of course also be employed, if appropriate, together with the abovementioned cationic auxiliaries, i.e. simultaneously or successively. However, since many of the auxiliaries contain organically bonded halogen, combination with AOX-free and/or AOX-low auxiliaries is particularly preferred, since chlorine-free papermaking is the chief aim.

The polyisocyanates not only are readily compatible with the usual optical brighteners, but also cause an additional increase in whiteness together with these.

Furthermore, a soft handle of the paper can be produced for use in the hygiene paper sector.

In the following examples, the percentage data are percentages by weight, unless stated otherwise.

EXAMPLES

1. Preparation of the water-dispersible isocyanates
Water-dispersible isocyanate 1

80 g of a polyisocyanate which is prepared by trimerization of some of the isocyanate groups of 1,6-diisocyanatohexane, containing isocyanate groups, essentially comprises tris-(6-isocyanato-hexyl) isocyanurate and higher homologues thereof and has an NCO content of 20.5%, a content of monomeric 1,6-diisocyanatohexane of less than 0.3% and a viscosity of 1000 mPas (25° C.) are reacted, by stirring at 60° C., with 20 g of a polyether which is based on ethylene oxide, has been started from 2-(2-methoxyethoxy)-ethanol and has a number-average molecular weight of 350 g/mol and a hydroxyl number of 160 mg of KOH/g.

NCO content: 15.6%
Viscosity (25° C.): 1470 mPas

Water-dispersible isocyanate 2

As described above (water-dispersible isocyanate 1), the following are reacted using the same starting compounds:

78 g of isocyanate
22 g of polyether
NCO content: 15%
Viscosity (25° C.): 850 mPas Water-dispersible isocyanate 3

As described above, the following are reacted using the same starting compounds:

76 g of isocyanate
24 g of polyether
NCO content: 14.7%
Viscisoty (25° C.): 835 mPas Water-dispersible isocyanate 4

As described above, the following are reacted using the same starting compounds:

73 g of isocyanate
27 g of polyether
NCO content: 12.9%
Viscosity (25° C.): 1490 mPas Water-dispersible isocyanate 5

As described above, the following are reacted using the same starting compounds:

70 g of isocyanate
30 g of polyether
NCO content: 12.2%
Viscosity (25° C.): 1470 mPas Water-dispersible isocyanate 6

As described above, the following are reacted using the same starting compounds:

67 g of isocyanate
33 g of polyether
NCO content: 11.2%
Viscosity (25° C.): 1470 mPas Water-dispersible isocyanate 7

As described above, the following are reacted using the same starting compounds:

64 g of isocyanate
36 g of polyether
NCO content: 10.3%
Viscosity (25° C.): 1490 mPas Water-dispersible isocyanate 8

As described above, the following are reacted using the same starting compounds:

61 g of isocyanate
39 g of polyether
NCO content: 9.4%
Viscosity (25° C.): 1420 mPas Water-dispersible isocyanate 9 (comparison)

As described above, the following are reacted using the same starting compounds:

85 g of isocyanate
15 g of polyether
NCO content: 17.3%
Viscosity (25° C.): 1425 mPas
Water-dispersible isocyanate 10 (comparison)

As described above, the following are reacted using the same starting compounds:

82 g of isocyanate
18 g of polyether
NCO content: 16.5%
Viscosity (25° C.): 1000 mPas All the reaction products are water-clear liquids with an oily appearance which can easily be dispersed in water (in a glass beaker by stirring by means of a spatula).

Use examples (mechanical wood pulp) 1 to 10

Mechanical wood pulp is beaten at a consistency of 2.5% to a degree of freeness of 38° SR in a beater. 100 g portions of the resulting mechanical wood pulp suspension are then diluted to a volume of 1000 ml with water in glass beakers. 0.5% by weight and 1.0% by weight of the water-dispersible isocyanates prepared, based on the solid, are added to the mechanical wood pulp dispersions, after prior dispersion in water (dispersion containing 20% by weight of polyisocyanate), and after the addition, these dispersions are stirred for a further 3 minutes.

Thereafter, sheets of paper having a weight per unit area of about 80 g/m² are formed on a sheet former (Rapid-K öthen apparatus) with the contents of the glass beakers. The sheets of paper are dried at 85° C. for 8 minutes in vacuo under 20 mm Hg and after-heated in a drying cabinet at 110° C. for a further 10 minutes. After climatic conditioning, 5 test strips of 1.5 cm width are cut out of each sheet of paper and immersed in distilled water for 5 minutes. The wet strips are then immediately tested for their wet breaking load on a tensile tester. The test results are summarized in the following summary table.

Wet breaking loads when used in the pulp, after condensation at 110° C.

| Use example no. | Water-dispersible isocyanate no. | NCO % | Polyether content % | Wet breaking load when 0.5/1.0% is used | | Notes |
|---|---|---|---|---|---|---|
| 1 | 9 | 17.3 | 15 | 4.7 | 5.7 | Comparison example |
| 2 | 10 | 16.5 | 18 | 6.3 | 7.2 | " |
| 3 | 1 | 15.6 | 20 | 4.3 | 7 | Example according to the invention |
| 4 | 2 | 15.0 | 22 | 6.6 | 7.9 | Example according to the invention |
| 5 | 3 | 14.3 | 24 | 6.9 | 8.7 | Example according to the invention |
| 6 | 4 | 12.9 | 27 | 7.2 | 8 | Example according to the invention |
| 7 | 5 | 12.2 | 30 | 7.5 | 9 | Example according to the invention |
| 8 | 6 | 11.2 | 33 | 7.3 | 7.9 | Example according to the invention |
| 9 | 7 | 10.3 | 36 | 6.3 | 7.3 | Example according to the invention |
| 10 | 8 | 9.4 | 39 | 5.9 | 7.4 | Example according to the invention |

Use examples for surface treatment of wood-free paper 11–21

Paper comprising eucalyptus and pine sulphate chemical pulp having a weight per unit area of 70 g/m² is treated with a sizing liquor of water-dispersible isocyanates in a laboratory sizing press from Mathis, Zurich, Switzerland, type HF.

0.5 and 1% strength aqueous dispersions of the water-dispersible isocyanates 1 to 10 were employed as the sizing liquors. In a further operation, 0.75% of an optical brightener was also added to the sizing liquor in addition to the 1% of water-dispersible isocyanate.

The wet pick-up of the paper was 80%. The papers were dried at 85° C. for 8 minutes and after-heated at 110° C. for 10 minutes. The wet breaking load was measured as in Examples 1 to 10.

The CIE whiteness was additionally determined. The results can be seen from the following summarizing table.

Wet breaking loads and whiteness when used on the surface

| | | Wet-breaking load at a polyisocyanate content in the size liquor of | | | Whiteness in the |
|---|---|---|---|---|---|
| Use example no. | Water-dispersible isocyanate no. | 0.5% of poly-isocyanate | 1% of polyiso-cyanate | 1% of polyiso-cyanate + 0.75% of optical brightener* | presence of 0.75% of optical brightener |
| 11** | 9 | 8.5 | 11.1 | 13.3 | 137.7 |
| 12** | 10 | 8.9 | 10.4 | 10.8 | 138.8 |
| 13 | 1 | 9.9 | 10.9 | 8.9 | 138.6 |
| 14 | 2 | 11.1 | 12.5 | 12.8 | 138.9 |
| 15 | 3 | 10.0 | 12.8 | 12.3 | 138.0 |
| 16 | 4 | 10.3 | 12.7 | 11.5 | 139.2 |
| 17 | 5 | 10.7 | 11.5 | 11.8 | 139.5 |
| 18 | 6 | 9.8 | 10.8 | 9.8 | 139.7 |
| 19 | 7 | 8.8 | 10.8 | 10.6 | 139.8 |
| 20 | 8 | 8.2 | 10.5 | 10.3 | 138.7 |

*optical brightener: Blankophor P liquid 01, commercial product from Bayer AG
**comparison example

We claim:

1. A process for improving the wet strength of paper, pasteboard and cardstock comprising adding to an aqueous dispersion of fibrous cellulose material before forming said paper, pasteboard or cardstock therefrom, or applying to the surface of said paper, pasteboard or cardstock, a mixture of water-dispersible isocyanates comprising aliphatic, cycloaliphatic, araliphatic or aromatic isocyanates having an NCO functionality of 1.8 to 4.2 and polyether-modified aliphatic, cycloaliphatic, araliphatic or aromatic isocyanates having an NCO functionality of 0.8 to 3.2, said mixture containing 1 to 25% by weight of isocyanate groups and having a content of ethylene oxide units, arranged in the form of polyether chains of average molecular weight 100 to 35000 (number-average), of 20 to 60% by weight in an amount sufficient to increase the wet strength of said paper, pasteboard or cardstock.

2. Process according to claim 1, characterized in that the isocyanate mixtures contain 1 to 23% by weight of isocyanate groups and have a content of ethylene oxide units, arranged in the form of polyether chains of average molecular weight 100 to 1000 (number-average), of 20 to 50% by weight, based on the isocyanate mixture.

3. Process according to claim 1, characterized in that water-dispersible polyisocyanates are used which have been prepared by reaction, in any desired sequence, of:

I. one or more non-modified polyisocyanates having an average NCO functionality of 1.8 to 4.2, II. mono- or polyfunctional polyalkylene oxide polyether alcohols containing on average 5.0 to 70 ethylene oxide units and optionally containing ester groups, and optionally III.A) amines which contain a group which is reactive towards isocyanates, of the formula A1)

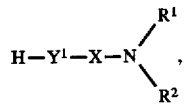
(A1)

in which $Y^1$ represents O, NH or $NR^3$, ($R^3$=methyl or ethyl), $R^1$ and $R^2$ a) independently of one another represent $C_1$-$C_4$-alkyl or $C_3$-$C_6$-cycloalkyl or b) represent a radical of the formula

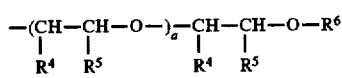

wherein
$R^4$ and $R^5$ independently of one another denote hydrogen or methyl, but one of the radicals is always hydrogen,
$R^6$ denotes methyl or ethyl and
a is a number from 0 to 10, or c) represents a $C_2$-$C_4$-alkyl radical substituted by one or more tertiary amino groups and/or ammonium groups, of the formula

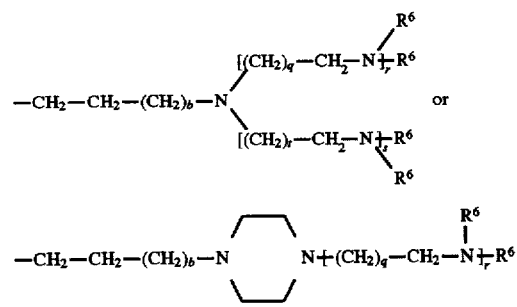

wherein
b is a number from 0 to 2,
q and t independently of one another denote 1 or 2 and
r and s independently of one another denote a number from 0 to 3 and $R^6$ has the abovementioned meaning,
or d) together with the N atom to which they are bonded form a 5- or 6-membered ring of the formula

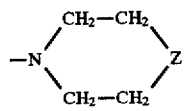

wherein
Z represents

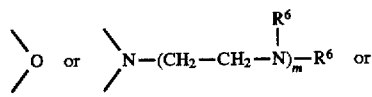

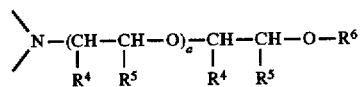

wherein
m is a number from 0 to 2 and
a, $R^4$ and $R^6$ have the abovementioned meaning,
X represents $C_2$- to $C_{10}$-alkylene, $C_5$- to $C_{10}$-cycloalkylene, a radical of the formula

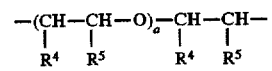

wherein $R^4$, $R^5$ and a have the abovementioned meaning, or a radical of the formula

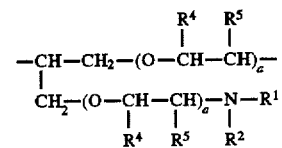

in which
a, $R^4$, $R^5$, $R^1$ and $R^2$ have the abovementioned meaning or

A2) of the formula

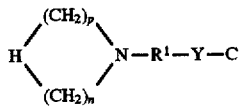

wherein
$Y^2$ represents —O—, —NH— or $NR^3$, wherein $R^3$ has the abovementioned meaning, n and p independently of one another may assume the values 1 or 2 and $R^1$ has the abovementioned meaning,
or A3) of the formula

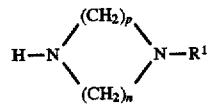

wherein n, p and $R^1$ have the abovementioned meaning,
or

A4) of the formula

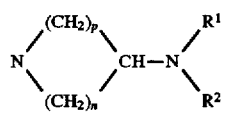

wherein n, p, $R^1$ and $R^2$ have the abovementioned meaning, or

B) amines which contain more than one group which is reactive towards isocyanates and optionally contain ether and/or ester and/or amide groups and have a molecular weight of less than 10000 g/mol or C) the compounds which are obtained by reaction of A) or B) by protonation and/or quaternization, contain ammonium groups and are reactive towards isocyanates, or any desired mixtures of A) to C).

4. The process of claim 1, wherein said water-dispersible isocyanates further comprise a content of tertiary amino groups, ammonium groups or both, of 1 to 500 milliequivalents per 100 g of isocyanate mixture, and said content of said ethylene oxide units is 30 to 60% by weight.

* * * * *

UNITED STATES PATENT AND TRADEMARK OFFICE
CERTIFICATE OF CORRECTION

PATENT NO.    : 5,718,804
DATED         : February 17, 1998
INVENTOR(S)   : Jansen et al.

It is certified that error appears in the above-identified patent and that said Letters Patent is hereby corrected as shown below:

<u>Column 6,</u>
Line 50, after " [structure: HO-(CH$_2$)$_2$-N$^{(+)}$(C$_2$H$_5$)$_3$ An$^{(-)}$] " insert -- where An$^{(-)}$ = CH$_3$OSO$_3^{(-)}$, Cl$^{(-)}$, Br$^{(-)}$, --

<u>Column 13,</u>
Line 11, delete "carded" and substitute -- carried --

<u>Column 18,</u>
Line 48, delete " [structure with H, (CH$_2$)$_p$, (CH$_2$)$_n$, N-R$^1$-Y-C] " and substitute -- H-Y$^2$-CH[(CH$_2$)$_p$/(CH$_2$)$_n$]N-R$^1$ --

Signed and Sealed this

First Day of July, 2003

JAMES E. ROGAN
*Director of the United States Patent and Trademark Office*